Figure 1:
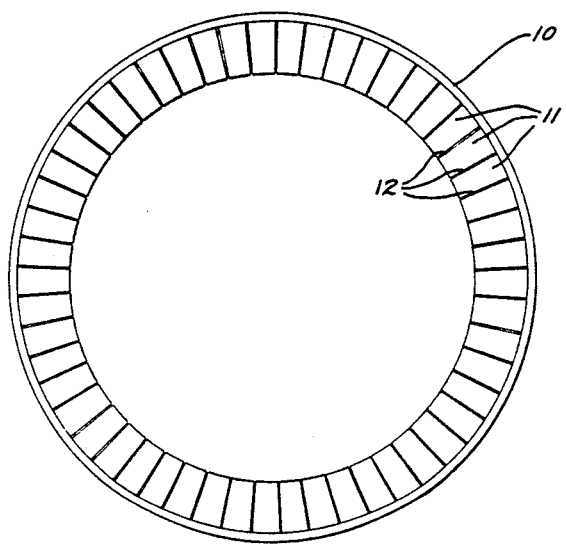

Nov. 15, 1966  O. M. WICKEN  3,285,762
REFRACTORY MORTAR COMPOSITION
Original Filed Nov. 20, 1963

INVENTOR.
OSCAR M. WICKEN
BY
ATTORNEY

United States Patent Office 3,285,762
Patented Nov. 15, 1966

3,285,762
REFRACTORY MORTAR COMPOSITION
Oscar M. Wicken, Pittsburgh, Pa., assignor to Harbison-Walker Refractories Company, Pittsburgh, Pa., a corporation of Pennsylvania
Original application Nov. 20, 1963, Ser. No. 325,019. Divided and this application Oct. 14, 1965, Ser. No. 496,118
2 Claims. (Cl. 106—60)

This application is a divisional application of application Serial No. 325,019, filed November 20, 1963, and having the same inventor, title and assignee as the present invention.

This invention relates to the construction of rotary kiln linings and, more particularly, to construction of basic refractory rotary kiln linings in such as cement kilns or the like. In a specific aspect, the invention relates to an improved method of constructing a basic refractory lining in a rotary kiln of the type in which reducing conditions may exist. By reducing conditions, I mean the kiln atmosphere, during operation, is not oxidizing. Such conditions are encountered in certain rotary kiln operations in which an excess of fuel is introduced to the kiln over that which can stoichiometrically combine with the available oxygen in the kiln. Some rotary kilns are operated under these conditions in order to increase output.

Contrary to what one might at first think, even though all of the fuel is not utilized, the operation is more economical because of the increased output.

It has long been known in the art to provide metal cases about at least a few of the side surfaces of the refractory brick or blocks which are used to fabricate rotary kiln linings. In theory and in operation, the metal plates oxidize and near the hot face react with the brick firmly bonding adjacent brick. The result is a monolithic lining more able to resist stresses and strains normally encountered in the operation of a rotary kiln. When kilns are operated under reducing conditions, the metal plates do not oxidize and, under severely reducing conditions, may melt and be partially absorbed by the refractory, the end result being the lack of bond and/or monolithic structure besides having a general loosening of the brickwork.

It is, therefore, an object of this invention to provide a novel method of fabricating a basic refractory lining in a rotary kiln or the like without the use of metal plates. It is still another object of this invention to provide a novel method of fabricating basic refractory, rotary kiln lining capable of attaining monolithic characteristics under reducing operating conditions.

Briefly, according to one aspect of this invention, those portions of a rotary kiln refractory lining which are subjected to reducing conditions in operation, are installed without the use of metal plates. Rather, the basic refractory brick or blocks used in this area are initially installed and temporarily joined together with a plastic and adhesive composition consisting essentially of at least about 50% finely divided iron oxide ($Fe_2O_3$), about 40% of ball mill fine dead burned magnesite, and about 10% of a water-soluble hydrated powder sodium silicate (all percentages, by weight). To install the brick, the adhesive composition is mixed with about 25 to 30 parts, by weight, of water; and the resulting plastic mixture is trowelled or otherwise applied to the four sides of the brick or block, which are to be perpendicular or normal to the longitudinal axis of the kiln. The prepared brick are then laid up about the interior surface of the kiln shell in the normal manner. The plastic mixture is air setting, and develops sufficient strength within a few hours to hold the brick in place about the kiln shell. The kiln is then fired in the normal manner, in which the above discussed reducing conditions are developed. The plastic composition undergoes chemical or mineralogical reaction to form magnesio-ferrite within itself and by reaction with adjacent surface areas of the basic brick with which they are used.

In actual tests, brick made of refractory material of the type disclosed in Pitt et al., United States Patents 2,291,917 and 2,291,918, which are commercially available as the manufacture of Canadian Refractories Limited, a Canadian corporation, under the trademark "Magnecon," were laid up in a rotary kiln with a plastic composition according to this invention, which consisted essentially of:

| | Percent (by weight) |
|---|---|
| Iron oxide ($Fe_2O_3$), —100 mesh | 50 |
| Dead burned magnesite,[1] —65 mesh | 40 |
| Sodium silicate,[2] —100 mesh | 10 | and up to about 1%, based on the weight of solids of an organic plasticizer such as cornstarch, gum arabic, etc.

[1] About 50% of this material being held on a 325 mesh screen. (Such a material is normally referred to as ball mill fines in the art.)
[2] Hydrated powder sodium silicate, having a $Na_2O$ to $SiO_2$ weight ratio of 1:3.22. The foregoing dry constituents were mixed with between 25 and 30 parts, by weight, of water.

The magnesite used was a synthetic dead burned magnesite, recovered from sea water, and having the following approximate oxide analysis, by weight:

| | Percent |
|---|---|
| Silica ($SiO_2$) | 2.8 |
| Alumina ($Al_2O_3$) | 0.3 |
| Iron oxide ($Fe_2O_3$) | 0.6 |
| Lime (CaO) | 1.5 |
| Magnesia (MgO) | 94.8 |

The kiln was fired according to usual operating techniques, and very satisfactory service was obtained. The plastic material had sufficient strength to hold the brick in place until normal kiln operating temperatures were reached; and, at these operating temperatures, chemically or mineralogically reacted and bonded to the adjacent brick to provide a monolithic lining.

It should be understood that other types of dead burned magnesite, besides that given immediately above, can be used according to the concepts of this invention. In fact, any of the many dead burned magnesites commercially available as items of commerce are usable. The iron oxide is, preferably, technical grade, which is what was used in the tests just discussed; and which is in the order of about 95 plus percent, $Fe_2O_3$.

The sodium silicate used should be in powder form and relatively stable in storage. We know of other hydrated powder sodium silicates which can be used having sodium oxide to silicon dioxide weight ratios of 1:2.00 and 1:1. Either of these latter sodium silicate powders are at least —65 mesh. I do not believe the particular sodium silicate used to be particularly critical, other than its ability to provide sufficient strength upon air setting to hold the brick in place before firing of the rotary kiln.

In laboratory tests, using various proportions of iron oxide and dead burned magnesite, it was discovered the iron oxide content may vary between about 30 and about 50%. When the iron oxide content was increased to the order of 70% (all percentages herein referred to are by weight), very poor strength was developed after drying. For example, a "Magnecon" type brick was sawed in half, and then joined together with a mixture having the following composition: 70% iron oxide, 20% dead burned magnesite, 10% hydrated powdered sodium silicate having an $Na_2O$ to $SiO_2$ weight ratio of 1:3.2, about 0.2%, based on the weight of dry solids of cornstarch, and about 30 parts, by weight, based on the total weight of dry solids of water, to bring the mixture to trowelling consistency. After drying for about 12 hours at a temperature of about 250° F., the adhesive joint had a modulus of rupture of only 170 p.s.i. After heating to 1700° F., the joint powdered and had no measurable strength in a modulus of rupture test.

In a comparative test using the preferred composition of the invention as set forth above (50% iron oxide, 40% of the magnesite and 10% sodium silicate powder) the modulus of rupture after drying under identical conditions was 400 p.s.i. After heating to 1700° F., modulus of rupture was about 70 p.s.i.

It was, also, found that up to about 10 parts, by weight, of a very finely divided (−325 mesh) ball clay plasticizer (such as air floated ball clay) could be substituted for a portion of the dead burned magnesite, as one approached the lower operable composition limit of about 30 parts, by weight, iron oxide.

Therefore, satisfactory compositions have from about 30 to about 50% finely divided (at least −65 mesh) iron oxide, 20 to about 50%, by weight, ball mill fine dead burned magnesite, 0 to about 10%, by weight, of finely divided ball clay plasticizer, and about 10%, by weight, of sodium silicate having a sodium oxide to silicon dioxide weight ratio in the range 1:1 to 1:3.22. The sodium silicate addition can vary in the range about 5 to about 15%, by weight, of the total solids. As the percent of sodium silicate varies, there should be a corresponding increase or decrease in the ball mill fine dead burned magnesite, for example.

The tempering fluid (preferably water) used to bring the mixture to trowelling consistency is, of course, variable, and depends upon the brick mason and his idiosyncrasies as to workability, but I suggest between about 25 and 30 parts, by weight.

Superior results are obtained when the iron oxide addition is maintained between about 45 and 55%, by weight, of the total solids. Optimum results were obtained when the iron oxide amounts to about 50%, by weight, as set forth in the embodiment as discussed above, relative to actual trials in a rotary cement kiln.

Still further, tests were conducted in the laboratory by heating a test brick (a "Magnecon" type brick sawed in half and then rejoined with the plastic composition of the invention) to about 2600° F. under reducing conditions. The preferred composition was visually determined to have very fine cracks. The workable, but less satisfactory, compositions, having only about 30% of iron oxide, had slightly larger cracks. A composition having 70% of the iron oxide (the one discussed above) was visually determined to have cracks as large as ⅛".

In discussing the sizing of the various dry ingredients, above, it was mentioned that the magnesite was ball mill fines or nominally −65 mesh. Satisfactory results can be obtained using magnesite which includes somewhat larger particles; for example, 10% of the mix can be about −28 +65 mesh dead burned magnesite. Further, trace amounts, i.e. up to about 2 or 3%, by weight, of the total batch, can be about −28 +65 mesh dead burned magnesite. Further, trace amounts, i.e. up to about 2 or 3%, by weight, of the total batch, can be −10 +28 mesh.

I am aware that prior workers in the art have suggested use of iron or metal filings, metal shot and the like, perhaps in combination with some iron oxide, as hardened coatings for hydratable brick. I am, also, aware that iron oxide has been suggested, in combination with other ingredients such as aluminum or magnesium metal, to form a thermite-type product which can be used as a mortar; and which is ignited to produce an exothermic reaction. Iron-base alloys such as ferro-chrome and ferro-titanium have also been apparently suggested to coat brick.

Figure 2:
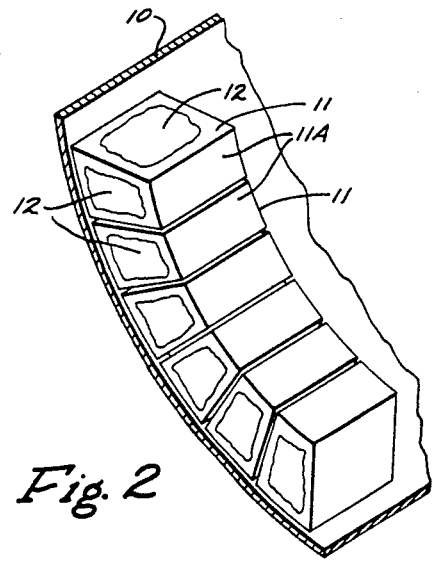
Figure 3:
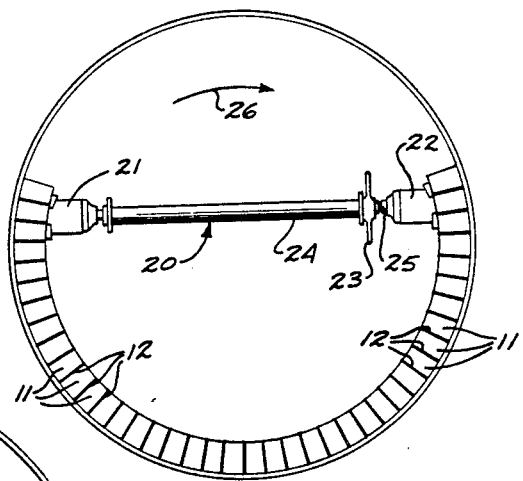
Figure 4:
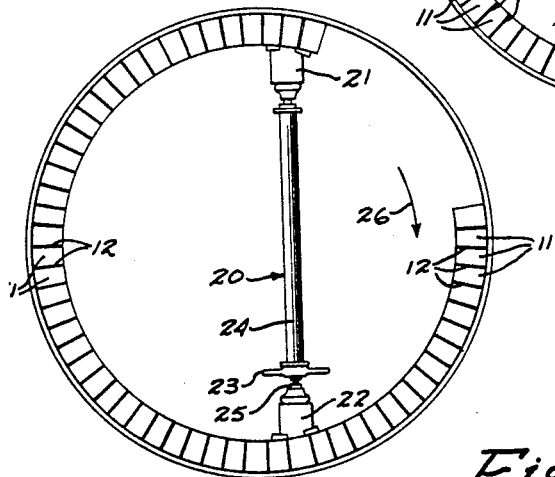

The drawings are schematically indicative of a manner in which the method of this invention can be carried out in laying up a rotary kiln lining. FIG. 1 is a schematic and view of a rotary kiln; and FIG. 2 is an enlarged perspective view of a portion of the kiln of FIG. 1, indicating the manner in which a rotary kiln lining is laid up according to this invention.

The exterior cylindrical rotary kiln shell 10 has a plurality of basic refractory brick 11 circumferentially positioned about its interior surface. The brick are held initially or temporarily in place by the adhesive composition 12, according to this invention. As is conventional, a wooden framework 9 is used to hold the brick 11 in place, while the adhesive of joints 12 is allowed to set. Upon firing, a chemical or mineralogical reaction occurs through the adhesive 12 and with the adjacent brick 11 to form a monolithic lining internally of the shell 10. The adhesive 12 is applied only to the surfaces or sides of the brick 11, which are normal to the longitudinal axis of the kiln shell 10. It is undesirable to use the adhesive on that face adjacent the kiln shell, as this might cause joinder of the brick to the shell 10. Such a condition would considerably increase the difficulties of subsequent removal of the lining when replacement is necessary. Further, it is not desirable to place any of the adhesive on the interfaces 11A of the brick, as this would probably contaminate the kiln product, and would really serve no use in the installation.

Having thus described the invention in detail and with sufficient particularity as to enable those skilled in the art to practice it, what is desired to have protected by Letters Patent is set forth in the following claims.

I claim:
1. An adhesive composition for laying up basic refractory brick consisting essentially of a mixture of from 45 to about 50%, by weight, of −65 mesh iron oxide, 20 to 50%, by weight, of ball mill fine dead burned magnesite, 0 to 10%, by weight, of finely divided ball clay plasticizer, about 5 to 15%, by weight, of powder sodium silicate having a sodium oxide to silicon dioxide weight ratio between 1:1 to 1:3.2, and an effective amount of an organic plasticizer to provide plasticity.

2. An adhesive composition for laying up basic refractory brick consisting essentially of a mixture of from 30 to about 55%, by weight, of −65 mesh iron oxide, 20 to 45%, by weight, of ball mill fine dead burned magnesite, 0 to 10%, by weight, of finely divided ball clay plasticizer, about 5 to 15%, by weight, of powder sodium silicate having a sodium oxide to silicon dioxide weight ratio between 1:1 to 1:3.22, and an effective amount of an organic plasticizer to provide plasticity.

References Cited by the Examiner
UNITED STATES PATENTS
2,170,254   8/1939   Seil _____ 264—60

TOBIAS E. LEVOW, *Primary Examiner.*
J. POER, *Assistant Examiner.*